United States Patent
Koerber et al.

(10) Patent No.: US 11,740,349 B2
(45) Date of Patent: Aug. 29, 2023

(54) RADAR SENSOR HAVING A TWO-DIMENSIONAL BEAM SCAN AND L-, U- OR T- SHAPED STRUCTURE FOR MOUNTING IN THE REGION OF THE FRONT RADIATOR OF AN AUTOMOBILE

(71) Applicant: ASTYX GmbH, Ottobrunn (DE)

(72) Inventors: Richard Koerber, Hallerndorf (DE); Guenther Trummer, Beiersdorf (DE)

(73) Assignee: CRUISE MUNICH GMBH, Ottobrunn (DE)

( * ) Notice: Subject to any disclaimer, the term of this patent is extended or adjusted under 35 U.S.C. 154(b) by 280 days.

(21) Appl. No.: 16/476,658

(22) PCT Filed: Dec. 13, 2017

(86) PCT No.: PCT/EP2017/082619
§ 371 (c)(1),
(2) Date: Jul. 9, 2019

(87) PCT Pub. No.: WO2018/130364
PCT Pub. Date: Jul. 19, 2018

(65) Prior Publication Data

US 2019/0377083 A1    Dec. 12, 2019

(30) Foreign Application Priority Data

Jan. 11, 2017    (DE) .......................... 102017200383.9

(51) Int. Cl.
*G01S 7/02* (2006.01)
*G01S 13/931* (2020.01)
(Continued)

(52) U.S. Cl.
CPC ............ *G01S 13/931* (2013.01); *G01S 7/023* (2013.01); *G01S 7/0233* (2021.05);
(Continued)

(58) Field of Classification Search
CPC ........ G01S 13/88; G01S 7/023; G01S 13/325; G01S 13/342; G01S 13/343;
(Continued)

(56) References Cited

U.S. PATENT DOCUMENTS

| 6,121,919 | A  | * | 9/2000 | Ameen | ................. G01S 7/4021 |
| | | | | | 342/174 |
| 9,575,160 | B1 | * | 2/2017 | Davis | ...................... G01S 7/023 |

(Continued)

FOREIGN PATENT DOCUMENTS

| DE | 102008052246 | 4/2010 |
| DE | 102008061932 | 7/2010 |

(Continued)

OTHER PUBLICATIONS

DE Search Report in German Appln. No. 102017200383.9, dated Nov. 13, 2017, 19 pages (Machine Translated).

(Continued)

*Primary Examiner* — Matthew M Barker
(74) *Attorney, Agent, or Firm* — CALFEE, HALTER & GRISWOLD LLP

(57) ABSTRACT

Apparatuses and methods for two-dimensional beam scanning for determining the position of an object in three-dimensional space are provided. An apparatus comprises a multiplicity of transmitters and receivers, which are arranged orthogonal to one another in an L-, U- or T-shaped structure. In one apparatus, the transmission signals are frequency and phase modulated in combination; and in another apparatus a single frequency carrier signal is subject to binary phase modulation. Here, this is a high-frequency encoding with a great code length, which is generated according to the pseudo-random number principle. The received signals, which include information from all transmitters, are decoded and consequently split into sub-signals, (Continued)

real and virtual array, T-structure when installed in front of the radiator real and virtual array, L-structure when installed in front of the radiator which can be assigned to a two-dimensional virtual array. According to the method of digital beamforming, the individual signals of the virtual antenna elements are formed into a plurality of highly focused beams in the horizontal and vertical direction.

5 Claims, 8 Drawing Sheets

(51) Int. Cl.
G01S 13/32 (2006.01)
G01S 13/34 (2006.01)

(52) U.S. Cl.
CPC .......... *G01S 7/0234* (2021.05); *G01S 13/325* (2013.01); *G01S 13/343* (2013.01); *G01S 2013/93271* (2020.01)

(58) Field of Classification Search
CPC .......... G01S 13/931; G01S 2013/9327–93277; G01S 7/0233; G01S 7/0234
See application file for complete search history.

(56) References Cited

U.S. PATENT DOCUMENTS

| | | | | |
|---|---|---|---|---|
| 10,629,998 | B2* | 4/2020 | Lim | H01Q 17/001 |
| 10,677,894 | B2* | 6/2020 | Wodrich | G01S 7/412 |
| 2009/0079617 | A1* | 3/2009 | Shirakawa | G01S 13/87 |
| | | | | 342/146 |
| 2014/0093665 | A1* | 4/2014 | Horibe | B60R 13/04 |
| | | | | 428/31 |
| 2015/0140259 | A1* | 5/2015 | Sugiura | B60R 13/005 |
| | | | | 428/72 |
| 2015/0198704 | A1* | 7/2015 | Schoor | G01S 13/424 |
| | | | | 342/147 |
| 2016/0256891 | A1* | 9/2016 | Yoshinaga | B05D 1/005 |
| 2016/0282450 | A1 | 9/2016 | Kishigami et al. | |
| 2017/0023674 | A1* | 1/2017 | Aleem | G01S 13/931 |
| 2017/0057424 | A1* | 3/2017 | Yamada | G01S 13/931 |
| 2017/0082730 | A1* | 3/2017 | Kishigami | G01S 7/28 |
| 2017/0276788 | A1* | 9/2017 | Wodrich | G01S 13/931 |
| 2017/0315231 | A1* | 11/2017 | Wodrich | G01S 13/87 |
| 2019/0143909 | A1* | 5/2019 | Mayer Pujadas | H01Q 1/3283 |
| | | | | 342/70 |
| 2019/0232886 | A1* | 8/2019 | Okumura | H01Q 1/44 |
| 2019/0324137 | A1* | 10/2019 | Khlifi | H01Q 1/44 |

FOREIGN PATENT DOCUMENTS

| | | | | |
|---|---|---|---|---|
| DE | 102010063665 | | 6/2012 | |
| DE | 102011083756 | | 4/2013 | |
| DE | 102014208899 | | 11/2015 | |
| DE | 102015006287 | A1 * | 12/2015 | ............ B60S 1/0848 |
| EP | 2045612 | | 4/2009 | |
| EP | 2963442 | | 1/2016 | |
| JP | 2007085751 | A | 4/2007 | |
| WO | 2013045232 | | 4/2013 | |
| WO | 2013045232 | A1 | 4/2013 | |

OTHER PUBLICATIONS

PCT International Preliminary Report on Patent Ability in International Appln. No. PCT/EP2017/082619, dated Jul. 25, 2019, 18 pages (English Translation).
PCT International Search Report and Written Opinion in International Appln. No. PCT/EP2017/082619, dated Mar. 23, 2018, 21 pages (English Translation).
"Office Action for Japanese Patent Application No. 2019-536170", dated Sep. 7, 2021, 7 Pages.

* cited by examiner

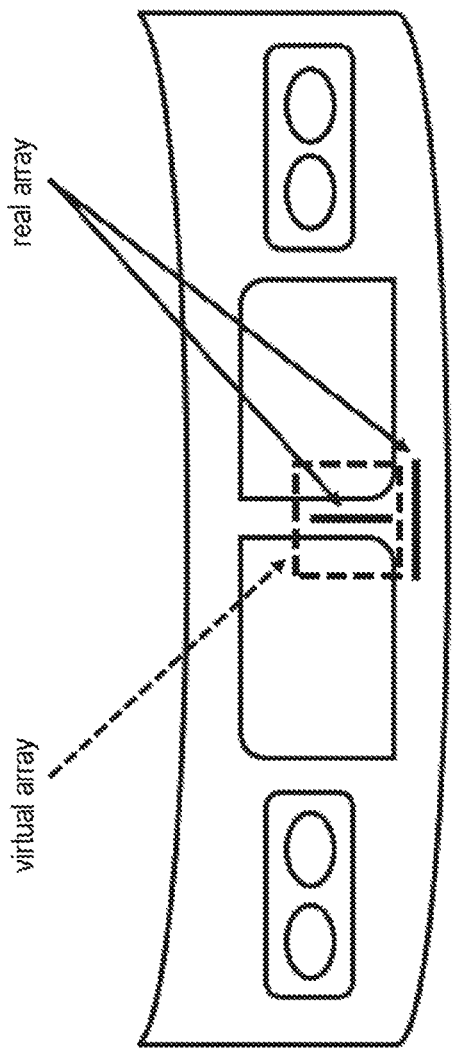
Fig. 1a: real and virtual array, T-structure when installed in front of the radiator
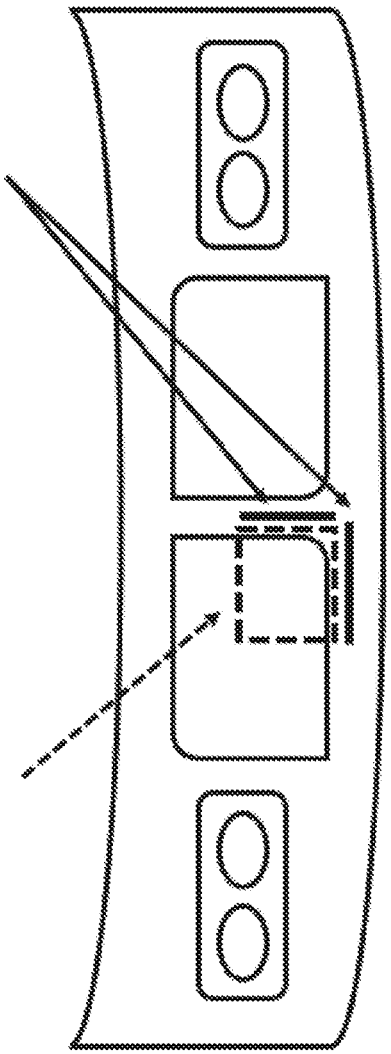
Fig. 1b: real and virtual array, L-structure when installed in front of the radiator

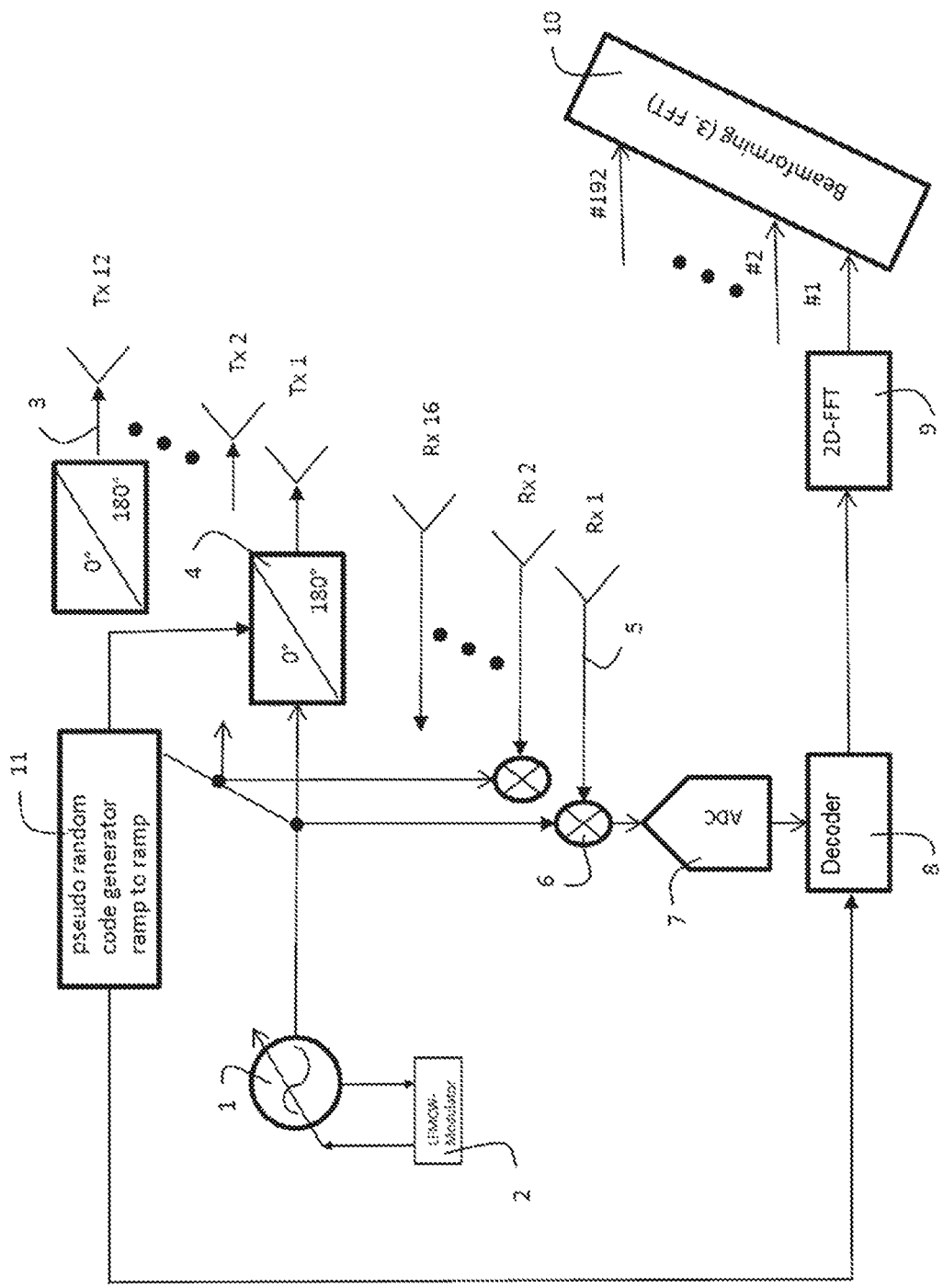

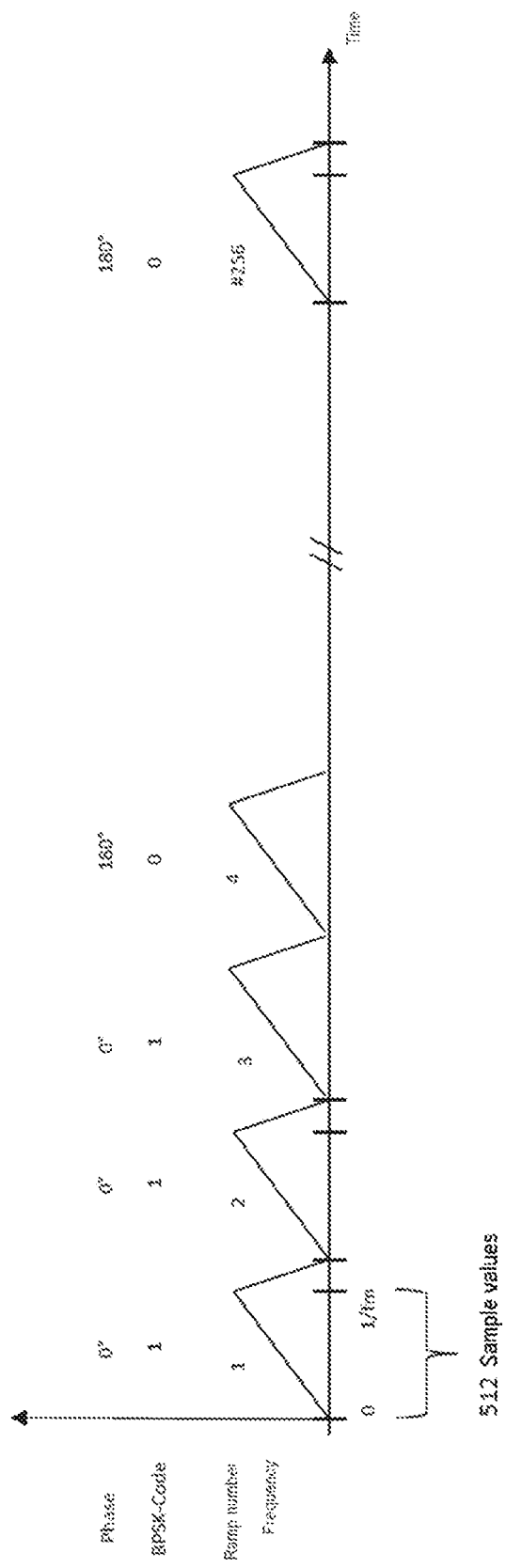

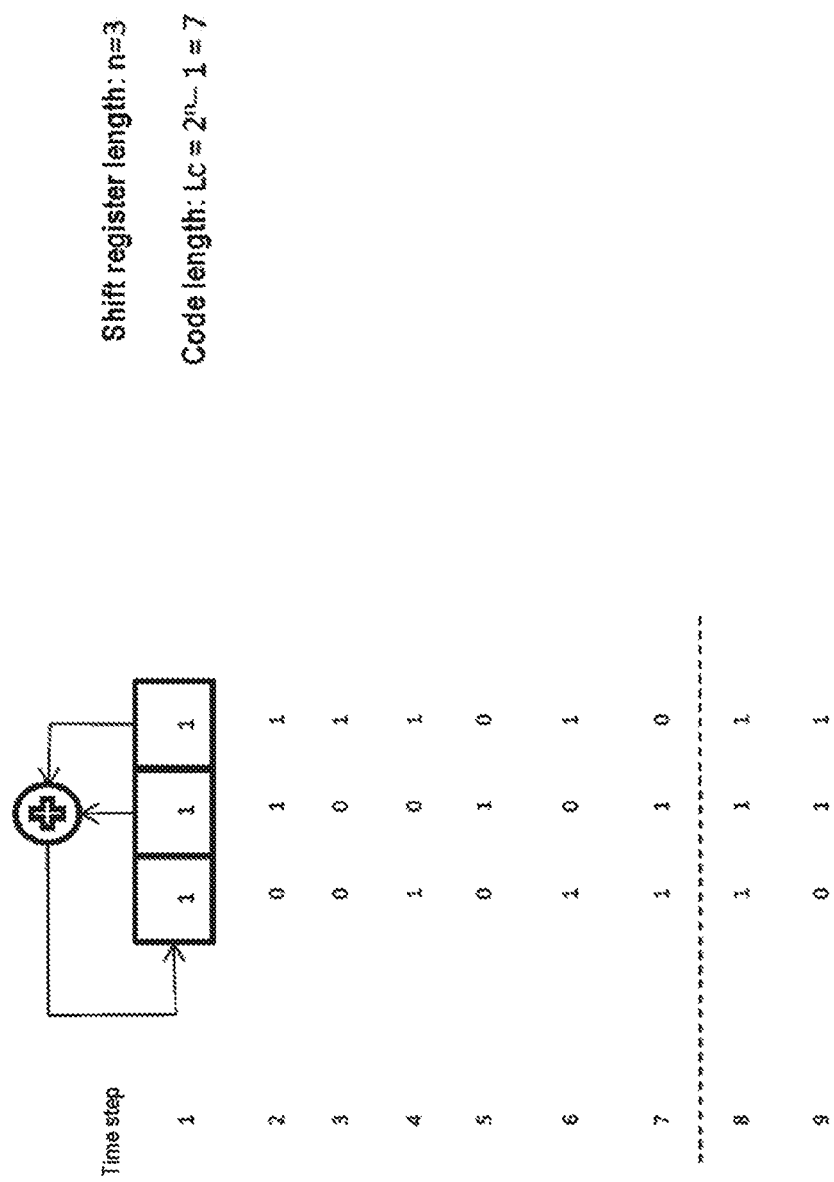

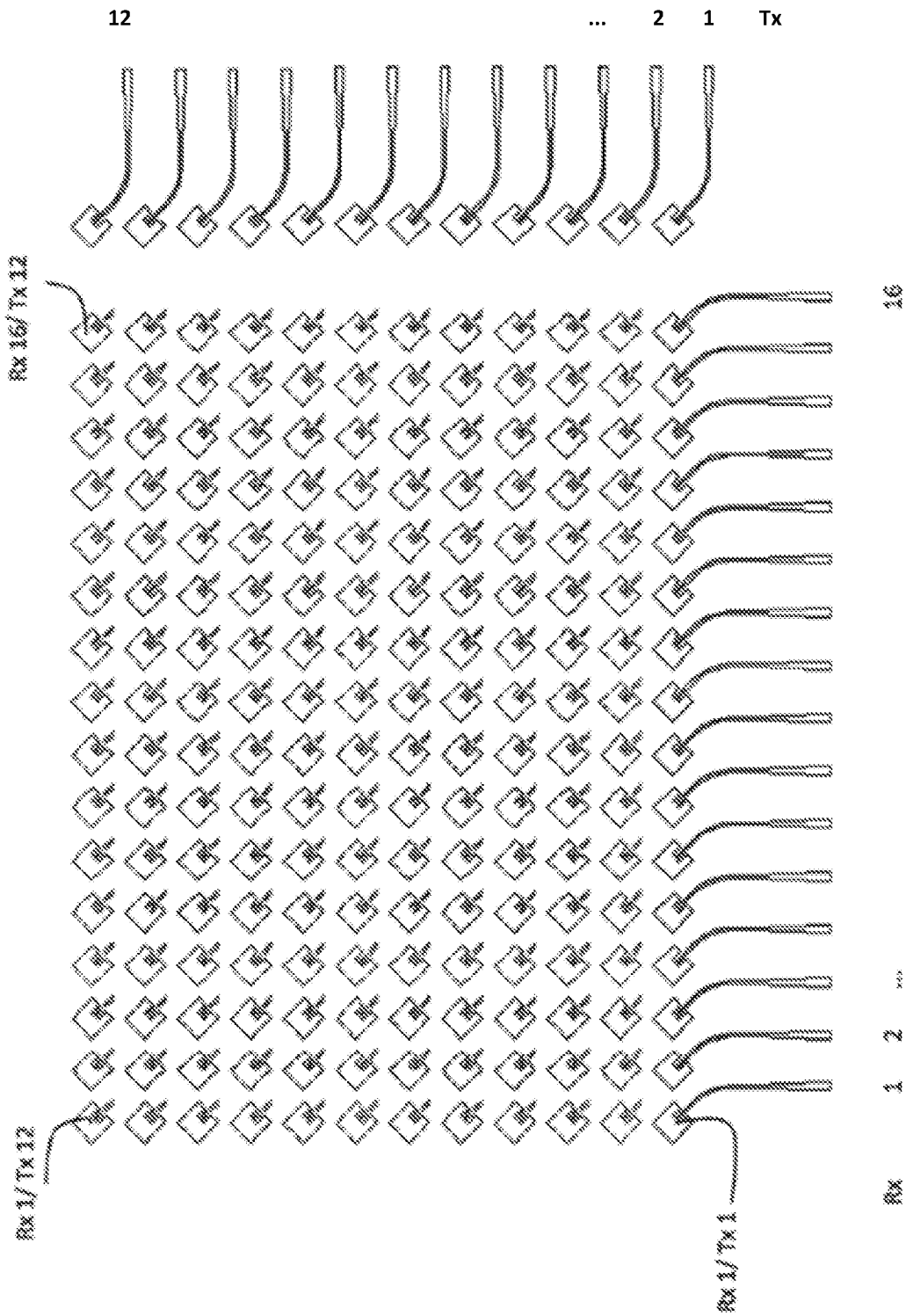
Fig. 5: Virtual array

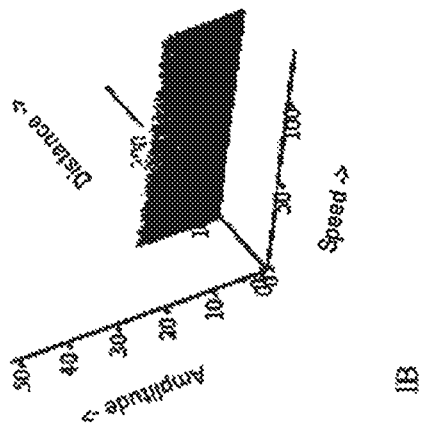
Fig. 6: Distance-speed matrix of a received signal after the 2D-FFT

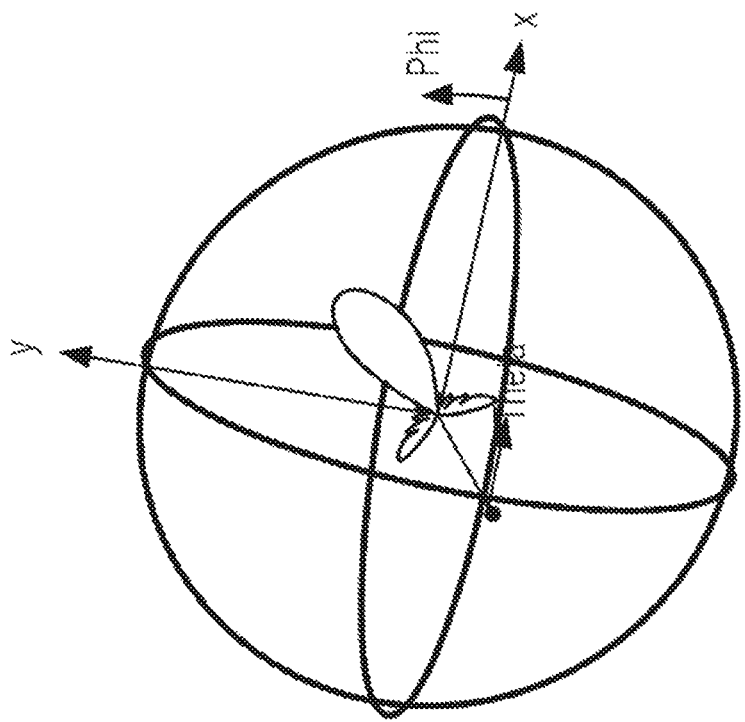
Fig. 7: Antenna lobe of the 16 x 12 element array

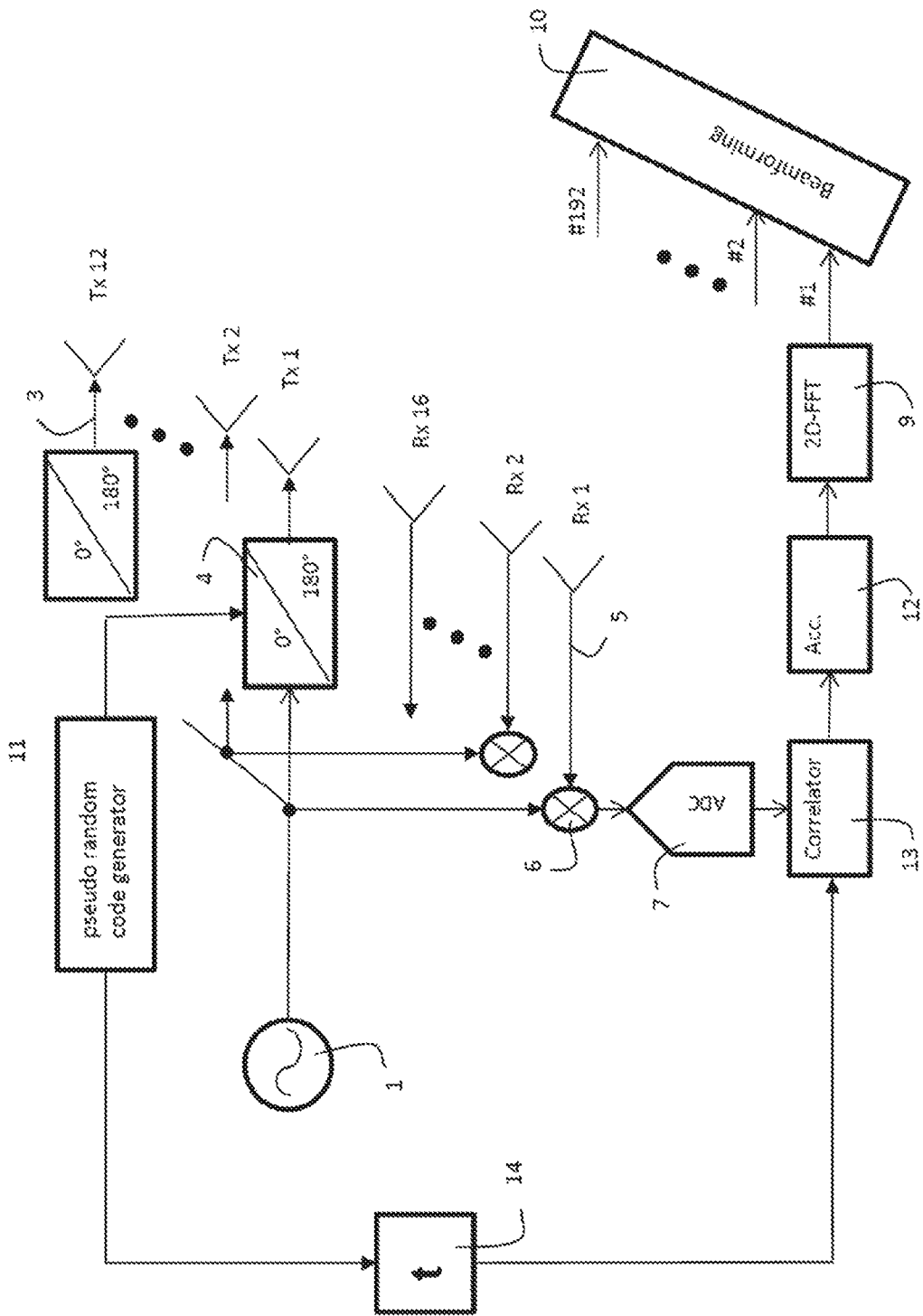

RADAR SENSOR HAVING A TWO-DIMENSIONAL BEAM SCAN AND L-, U- OR T- SHAPED STRUCTURE FOR MOUNTING IN THE REGION OF THE FRONT RADIATOR OF AN AUTOMOBILE

CROSS REFERENCE TO RELATED APPLICATIONS

The present application is the national stage entry of International Patent Application No. PCT/EP2017/082619, filed on Dec. 13, 2017, and claims priority to Application No. DE 102017200383.9, filed on Jan. 11, 2017, the disclosures of which are incorporated herein by reference.

TECHNICAL FIELD OF APPLICATION

The invention relates to an apparatus and a method for measuring the vertical and horizontal position of objects with a radar sensor, which performs a digital beam forming operation with a two-dimensional virtual array. The radar sensor has an L-, U- or inverted T-shaped structure, which allows the sensor to be installed in the frontal region of the automobile without significantly impairing the air flow required for the front radiator.

Millimeter-wave radar sensors for automotive applications, such as the adaptive cruise control/speed limiter are installed in the front region of the automobile in the forward direction. Ideally, the sensor should be mounted as high up as possible, to minimize the influence of the road surface on the propagation of the electromagnetic wave. These influences include multi-path propagations and reflections from the road, which impede the object recognition. Multi-path propagations, due to the superposition of signals from different directions, lead to amplitude variations and possibly the short-term cancellation of the signals. Reflections from the road surface, known as clutter, are superimposed on the desired object signal and thus reduce the signal-to-noise ratio.

An elevated installation position in combination with an additional vertical beam scanning significantly reduces these effects.

Depending on the design of the bodywork, this elevated position cannot be implemented, however, because the air flow required for the front radiator is impaired in an unacceptable way by the installation of the radar sensor.

This conflict of requirements is advantageously solved by the following invention. The housing and the antenna arrangement of the radar sensor are shaped in such a way that they can be integrated into the structure of the radiator grille. The antenna aperture of the radar sensor only exists in a virtual sense, so that in the region of the antenna aperture the air flow required for the cooling system can pass through unhindered. By the digital combination of a plurality of transmitting and receiving units the virtual antenna array generates a highly focused antenna beam, such as would be generated by a planar array, but unlike this, without affecting the air flow.

A further requirement is the detection of traffic congestion on the road. In this process stationary vehicles must be distinguished from bridges and manhole covers. Furthermore, a three-dimensional measurement of the objects is desired for object classification. This object is advantageously achieved by a two-dimensional beam scanning process.

FIGS. 1a and 1b are schematics that depict two rows of antennas having a T-, U-, or L-shaped structure.

FIG. 2 is a schematic that depicts a frequency modulated continuous-wave radar.

FIG. 3 is a schematic that depicts a sawtooth-shaped temporal waveform of a transmission frequency.

FIG. 4 is a schematic that depicts a 3-stage shift register.

FIG. 5 is a schematic that illustrates a virtual array.

FIG. 6 depicts a distance-speed-matrix.

FIG. 7 shows an antenna lobe of a 16×12 array.

FIG. 8 is a block circuit diagram of a radar system.

PRIOR ART

DE 10 2008 052 246 A1 describes a sensor system with an adjustable elevation beam direction for determining the vertical position of objects. The adjustment is carried out by the mechanical movement of a reflector.

In the unexamined application DE 10 2008 061 932 A1 a method for digital beam forming is described.

DESCRIPTION OF THE INVENTION

The object of the invention is to provide an apparatus and a method with which the above-described installation in the vehicle can be implemented.

In addition, an object of the invention is to provide an apparatus and a method with which the horizontal and vertical position of an object can be determined by means of a two-dimensional beam forming operation.

The object is achieved in relation to the apparatus by an antenna structure having an L-, U- or T-shaped structure and is mounted in the region of the front radiator of a vehicle. In addition, the antenna structure has a plurality of radar transmit/receive devices, where each transmit/receive device has a plurality of receivers and a plurality of transmitters and forms a virtual antenna array for two-dimensional horizontal and vertical beam scanning, and where the virtual antenna array corresponds to the region of the ventilation openings of a radiator grille of the front radiator.

Accordingly, the apparatus comprises an L-, U- or T-shaped structure, so that the air flow of the front radiator is either not or only slightly affected.

Moreover, the apparatus for determining a position of an object in three-dimensional space, in particular a moving object, comprises at least a plurality of receiving antennas arranged in a row, and of transmitting antennas arranged in a row, wherein the row of transmitting antennas is arranged orthogonally to the row of receiving antennas. The two rows of antennas preferably have a T-, U- or L-shaped structure (FIG. 1a, 1b). The antennas are preferably implemented as single-patch antennas with a wide beam lobe in the horizontal and vertical direction. The beam focusing and control is carried out exclusively via the digital beam-forming by combination of individual emitters. Compared to a highly-focused individual emitter, this has the advantage that in the digitally formed beam, the structure of a radiator grille only slightly affects the antenna directivity.

The device also comprises a frequency generator for generating a signal which is individually phase-encoded for each transmitting antenna. To form a virtual two-dimensional array, one transmitting antenna and one receiving antenna must be combined. The signal of the receiving antennas is first converted with the common unencoded transmission signal into an intermediate frequency level or into the baseband. This is followed by analog signal processing (filtering, amplification) and a digitization of the signals. The signal is then decoded with the code of the desired transmitting partner and the virtual two-dimensional array is generated.

In addition, the transmitters must be operated synchronously, with the result that the digital beam shaping method can be used even in highly dynamic scenarios, such as road traffic.

EXEMPLARY EMBODIMENTS

In the following, exemplary embodiments of the invention are explained in more detail based on a drawing. Equivalent parts are provided with the same reference labels in all figures.

Example 1

FMCW Radar with Phase Encoding from Frequency Ramp to Frequency Ramp

The invention relates to a frequency modulated continuous-wave radar (FMCW Radar) according to FIG. 2, which monitors an area with the aid of digital beam forming. The radar sensor in this case consists of a transmitter with a plurality of, e.g. 12, outputs (Tx) and a plurality of, e.g. 16, receivers (Rx). The transmitter consists of a voltage-controlled oscillator (1) with integrated frequency modulator (2) and 12 parallel outputs (3). The outputs are equipped with power amplifiers (4), which by applying a control signal (11) can change the phase of the transmitted signal by 180°.

FIG. 3 shows the sawtooth-shaped temporal waveform of the transmission frequency. During a frequency ramp the received signal is sampled, for example with 512 points. Approximately 256 ramps are recorded during one measurement cycle. The transmitted signal during the individual frequency ramps is binary-coded in phase by means of a so-called pseudo-random code generator. 0 means the phase is rotated by 180°, 1 means the phase remains the same.

The pseudo-random code is preferably generated by means of a shift register. FIG. 4 shows a 3-stage shift register. Depending on the initial encoding, a different code is set. The code length is calculated to give $N=2^n-1$, where n=number of register stages. In the register shown here with 3 stages, the code is thus repeated after 7 time steps. In practice, however, longer codes are preferred, since in this case the decoupling between the individual transmission signals is better.

In the receiver of the radar sensor according to FIG. 2, the signal reflected from the object and received by the antenna (5) is initially converted into the baseband with a mixer (6) and sampled by an AD-converter (7). The sampled signal is then decoded with the codes of the respective transmitters (8). Thus, with 16 receivers and 12 transmitters this results in 12*16=192 receive signals. These signals can be assigned to the elements of the virtual array that are shown in FIG. 5.

After the decoding a signal processing takes place such as that described, for example, in DE 10 2008 061 932 A1. This consists initially of a two-dimensional FFT, which generates a so-called distance-speed-matrix for each reception signal. FIG. 6 shows an example of such a matrix with an echo signal at distance cell 100 and speed cell 0. Due to the finite decoupling between the individual transmission codes, secondary lines are produced in the speed direction, which for the code length N=255 chosen here are approximately 20 dB below the useful signal. The dynamic range in the speed direction is thus restricted. The dynamic range in the distance direction is not affected. This means, for example, that objects at the same distance but with different speeds must differ in their echo amplitude by less than 20 dB in order still to be detected separately.

After the two-dimensional FFT (9), the antenna lobes (10) are formed. This is carried out by a weighting, phase shift depending on the desired viewing direction and summing of the individual channels, as is described e.g. in DE 10 2008 061 932 A1. Alternatively, a third FFT can be computed over the received signals, which then generates a plurality of antenna lobes in three-dimensional space, a subset of which is then used for the detection in the selected field of view. FIG. 7 shows the antenna lobe of a 16×12 antenna array. It has a beam width of 8° horizontally and 11° vertically, and a scanning range of +/−60° in the vertical plane and +/−65° in the horizontal plane.

Example 2

CW Radar with Phase Encoding Synchronous with the Sampling Frequency

Another exemplary embodiment is a binary phase encoding of a mono-frequency continuous-wave signal (so-called CW signal). FIG. 8 shows the block circuit diagram of this radar system. An oscillator (1) is operated with a mono-frequency carrier signal. This signal is first allocated over all 12 transmission channels (3) and subjected to a binary phase modulation for each channel by means of a "pseudo-random" code generator (4). The object echoes detected by the receiving antennas (5) are converted into the baseband with a mixer (6) and digitized with an AD-converter (7). This is followed by a cross-correlation (13) of the digitized signal with the respective time-delayed code of the transmitter (14), so that 12 signal paths are generated per receive channel. To improve the signal-to-noise ratio, multiple code sequences are then accumulated (12) and then fed to a signal processing stage—equivalent to example 1—consisting of 2D FFT (9) and beam forming (10).

In contrast to the relatively slow phase encoding according to example 1, here the phase of a mono-frequency signal is changed with each sample value. For the so-called chip length Tc, the following applies: $Tc=2*\Delta R/c$ with $\Delta R$: distance resolution c: speed of light Thus if the aim is to achieve a resolution of 10 cm, then a chip length of 0.67 nsec and a sampling rate of 1.5 giga-samples/sec. is necessary. For a code length of $2^{13}-1=8192$ the duration of the code Lc=5.46 μs. The code duration determines the maximum unique range. This is given by $Lc=2*Rmax/c$.

The maximum range in this example is thus 800 meters, which is sufficient for use in the automotive field.

The invention claimed is:

1. An apparatus for determining the position of an object in three-dimensional space, the apparatus, comprising:
   an antenna structure, wherein the antenna structure has an L-, U- or T-shaped structure and is mounted on a radiator grille of the front radiator of a vehicle, wherein the antenna structure comprises transmit antennas and receive antennas; and
   an analog to digital (ADC) converter that samples signals received by the receive antennas to form sampled signals, wherein the signals received by the receive antennas include codes that respectively correspond to the transmit antennas; and a decoder that decodes the sampled signals to form a virtual antenna array for two-dimensional horizontal and vertical beam scanning;

wherein the virtual antenna array corresponds at least in part to a ventilation opening of the radiator grille of the front radiator, wherein the transmit antennas are configured to simultaneously emit transmitted signals, and further wherein the apparatus employs both frequency modulation and phase modulation in connection with emitting the transmitted signals.

2. The apparatus of claim 1, wherein the transmit antennas are arranged in a first row and the plurality of receive antennas are arranged in a second row that is orthogonal to the first row.

3. The apparatus of claim 2, wherein the decoder decodes an incoming received signal received by the receive antennas with fixed transmission codes to generate a plurality of sub-signals from the incoming received signal, wherein the plurality of sub-signals corresponds to the transmit antennas.

4. The apparatus of claim 3, further comprising a pseudo-random number generator that provides binary 180° phase encoding for high-frequency phase modulation of a continuous-wave transmission signal with simultaneous operation of the transmit antennas.

5. The apparatus of claim 1, wherein the transmit antennas are single patch antennas that have a beam lobe in a horizontal and vertical direction.

* * * * *